(12) United States Patent
Ibrahim et al.

(10) Patent No.: US 9,292,715 B2
(45) Date of Patent: Mar. 22, 2016

(54) SHARED SECRET USED BETWEEN KEYBOARD AND APPLICATION

(75) Inventors: Wael M. Ibrahim, Cypress, TX (US); Liqun Chen, Bristol (GB); Manuel Novoa, Cypress, TX (US); Ligy Kurian, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 12/812,497

(22) PCT Filed: Jan. 22, 2008

(86) PCT No.: PCT/US2008/051603
§ 371 (c)(1),
(2), (4) Date: Jul. 12, 2010

(87) PCT Pub. No.: WO2009/094018
PCT Pub. Date: Jul. 30, 2009

(65) Prior Publication Data
US 2010/0287315 A1 Nov. 11, 2010

(51) Int. Cl.
*G06F 13/12* (2006.01)
*G06F 21/83* (2013.01)
*G06F 21/82* (2013.01)
*G06F 21/70* (2013.01)

(52) U.S. Cl.
CPC ............... *G06F 21/83* (2013.01); *G06F 21/70* (2013.01); *G06F 21/82* (2013.01)

(58) Field of Classification Search
CPC .......... G06F 21/83; G06F 21/70; G06F 21/82
See application file for complete search history.

(56) References Cited

U.S. PATENT DOCUMENTS

| | | | | |
|---|---|---|---|---|
| 5,903,653 A * | 5/1999 | Ross et al. | | 380/271 |
| 6,490,353 B1 * | 12/2002 | Tan | | 380/37 |
| 7,328,457 B1 * | 2/2008 | Mister | | 726/30 |
| 7,707,454 B2 * | 4/2010 | Hsieh | | 714/6.11 |
| 7,899,397 B2 * | 3/2011 | Kumar | | 455/41.2 |
| 2003/0159053 A1 * | 8/2003 | Fauble et al. | | 713/189 |
| 2004/0215971 A1 * | 10/2004 | Nam | | 713/200 |
| 2004/0230805 A1 * | 11/2004 | Peinado et al. | | 713/181 |
| 2006/0013402 A1 | 1/2006 | Sutton | | |
| 2006/0101128 A1 * | 5/2006 | Waterson | | 709/212 |
| 2006/0184785 A1 * | 8/2006 | Challener et al. | | 713/151 |
| 2007/0074068 A1 | 3/2007 | Hsieh | | |

(Continued)

FOREIGN PATENT DOCUMENTS

| | | |
|---|---|---|
| CN | 1599311 A | 3/2005 |
| JP | 2006343873 | 12/2006 |

(Continued)

OTHER PUBLICATIONS

Advanced Encryption Standard—Wikipedia, the free encyclopedia.*

(Continued)

*Primary Examiner* — Jing-Yih Shyu
(74) *Attorney, Agent, or Firm* — HP Inc Patent Department (57) ABSTRACT

A system comprises a processor which executes an operating system and an application. The system also comprises a keyboard coupled to the processor. The keyboard and application share a shared secret that is used to encode keyboard data provided from the keyboard to the application. The shared secret is not known or accessible to the operating system.

19 Claims, 4 Drawing Sheets

(56) References Cited

U.S. PATENT DOCUMENTS

2007/0079296 A1* 4/2007 Li et al. .................. 717/136
2007/0240212 A1* 10/2007 Matalytski ................ 726/22
2008/0189790 A1* 8/2008 Park ........................ 726/26

FOREIGN PATENT DOCUMENTS

KR  10 2002 0005117   1/2002
KR  10 2007 0016029   2/2007

OTHER PUBLICATIONS

A Symmetric Data Encryption Algorithm for Increasing Security by Md. Monir Hossain Mia, Md. Foizul Islam, M.A. Matin, Md. Nazrul Islam.*
Triple DES—Wikipedia, the free encyclopedia.*
Wael Ibrahim, et al., SIPO, First Office Action dated Apr. 12, 2012, CN Pat. App. 200880125372.X filed Jul. 7, 2010.

* cited by examiner

SHARED SECRET USED BETWEEN KEYBOARD AND APPLICATION

CROSS-REFERENCE TO RELATED APPLICATION

This application is a national stage application under 35 U.S.C. §371 of PCT/US2008/051603, filed Jan. 22, 2008.

BACKGROUND

Key loggers are products that detect the keys a user presses on a keyboard without the knowledge or permission of the user. Key loggers can be used, for example, to steal passwords typed by a user as the user logs on to a service or system. The advent of key logging products has created a need for anti-key logging products that attempt to defeat the ability of key loggers to function.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Additionally, the term "system" refers to a collection of two or more hardware and/or software components, and may be used to refer to an electronic device, such as a computer, a portion of a computer, a combination of computers, etc. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

Figure 1:
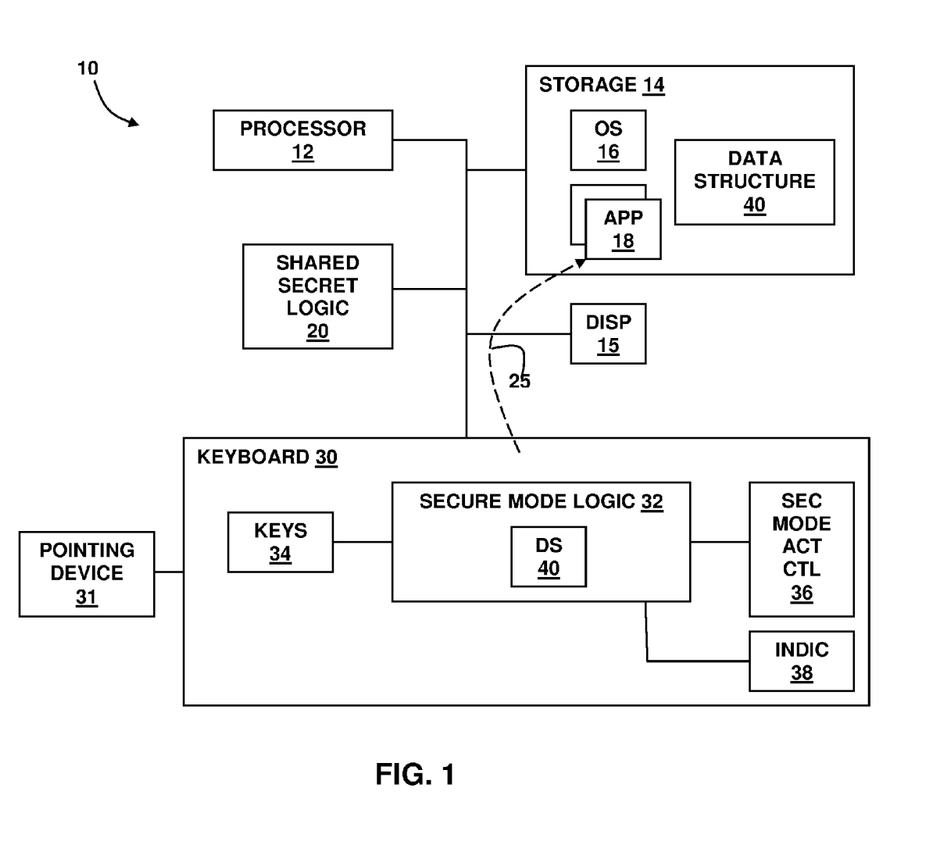
FIG. 1 shows a system diagram in accordance with various embodiments.

FIG. 1 shows a system 10 in accordance with various embodiments. As shown, the system 10 comprises a processor 12 coupled to storage 14, display 15, shared secret logic 20, and a keyboard 30, and a pointing device 31 (e.g., a mouse). The pointing device 31 may be coupled to the processor 12 via the keyboard 30 as shown. Via the keyboard, a user provides input to the system 10. The storage comprises volatile storage (e.g., random access memory), non-volatile storage (e.g., hard disk drive, compact disc read-only memory, etc.), or combinations thereof. The storage comprises an operating system 16 and one or more applications 18 that run under the control of the operating system. The operating system 16 and application(s) 18 comprise code that is executable by the processor 12. An application 18 may comprise any type of application such as a word processing application, a spreadsheet application, an Internet browser, etc.

The keyboard comprises secure mode logic 32, one or more keyboard keys 34 (e.g., a 101-key keyboard), a secure mode activation control 36, and a visual indicator 38. The secure mode activation control 36 comprises, in some embodiments, a button or other type of switch. The indicator 38 comprises a light emitting diode (LED) or other type of visual indicator (e.g., a "sprite" or other graphic overlaying a graphics frame buffer that is controlled by the operating system 16) to indicate whether the keyboard is in the non-secure mode or the secure mode, as explained below.

In accordance with various embodiments, a user of system 10 is able to run the keyboard 30 in a non-secure mode or in a secure mode. The technology described herein apply to any type of user-input device (keyboard, mouse, trackball, etc.), that is usable by a user in conjunction with an application. Regardless of the mode, for each user-activation of a key 34, one or more character codes are generated by and transmitted from the keyboard to the processor 12. Dashed arrow 25 indicates that the input from the keyboard is provided logically to the application 18 that is "in focus" when the user operates the keyboard 30. In the non-secure mode, for each user-activation of a key 34 on the keyboard, a character code corresponding to that key is transmitted to the application 18. The non-secure mode, keyboard, character codes are generally known to all applications 18 and the operating system 16 and, in at least some embodiments, are in accordance with the scan code and page table localization standard. A character code identifies the key a user pressed on the keyboard.

In the secure mode, which can be activated by a user activating the secure mode activation control 36, or by the application 18 requesting a secure session before accepting input, for each user-activation of a key 34, a packet of bits that does not match the character code associated with the key activated by the user is provided to the "in focus" application 18, passing through various OS layers. Such a packet of bits is understood by the application 18 receiving the packet, but is not understood by the operating system 16. In this manner, a secure communication channel is established between the keyboard 30 and an application 18.

The secure communication channel between keyboard and application uses a shared secret that is provided to the keyboard's secure mode logic 32 as well as the application 18. The shared secret key is generated by the shared secret logic 20 upon a user activating the secure mode activation control 36 on the keyboard 30, or by the application initiating a secure communication channel with the keyboard, for example, when the application detects that a data-entry "input box" on the display has been designated for protection. Some input boxes may prompt a user to enter a password or other private information entry forms that may prompt for information such as credit card numbers. In some embodiments, the generated shared secret key comprises a random number (e.g., a number generated from analog "white" noise or other techniques) used by the keyboard 30 and application 18 to populate a data structure 40, such as that shown in FIG. 2, to implement a secure communication channel.

Figure 2:
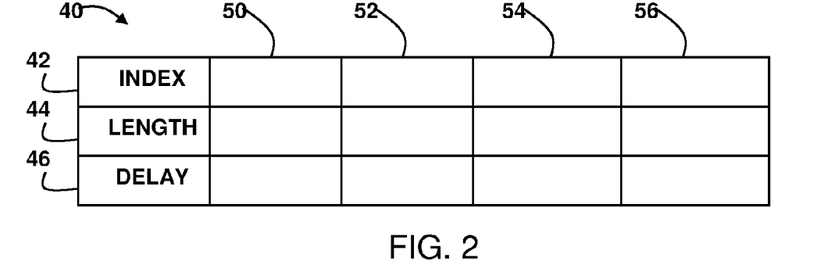
FIG. 2 shows an embodiment of a data structure that is populated by a shared secret.

FIG. 2 shows an exemplary format of data structure 40 into which the shared secret key is populated by the secure mode logic 32 of the keyboard 30 as well as the application 18. The illustrative data structure 40 comprises three rows of information. A first row 42 comprises index values. A second row 44 comprises length values. A third row 46 comprise delay values. Each column 50, 52, 54, and 56 comprises an index value 42, a length value 44, and a delay value 46. Each column of values is used to define a packet of character codes that the keyboard 30 generates each time a user activates (e.g., presses) a keyboard key 34. FIG. 2 comprises four columns 50, 52, 54, and 56 to define four packets of character codes, but a different number of columns may be provided in other embodiments.

Figure 3:
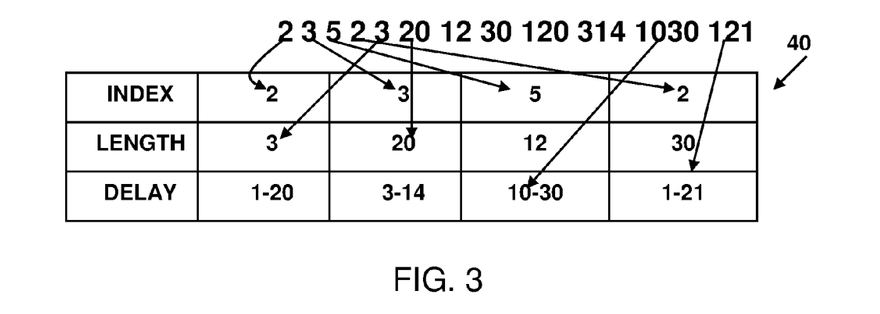
FIG. 3 shows an example of a particular shared secret populating the data structure of FIG. 2.

FIG. 3 illustrates a shared secret being used to populate a data structure 40. Each of the keyboard 30 and application 18 has such a data structure. The shared secret logic 20 generates the shared secret and provides the shared secret to each of the keyboard 30 and application 18. Each of the shared secret mode logic 32 of the keyboard 30 and application 18 populates its own data structure 40 using the shared secret as illustrated in FIG. 3. In the illustrative embodiment of FIG. 3, the shared secret is "2352320123012031410301 21." The first value "2" from the shared secret is used to populate the first cell in the data structure. That value corresponds to an index value in the first column. The next value "3" from the shared secret is used to populate the second cell in the data structure. That value corresponds to an index value in the second column. This process repeats until all of the index values of the data structure 40 comprise a full allotment of index values. The next value "3" from the shared secret is used to populate the first cell in the second row of the data structure. That cell comprises a length value. Subsequent shared secret values are used to populate the remaining entries in the data structure as shown in the illustrative example of FIG. 3.

In accordance with various embodiments, the keyboard's secure mode logic 32 generates a packet having multiple character codes each time a user activates a keyboard key 34. Each packet comprises a plurality of character codes. One of the character codes in the packet is associated with the particular key 34 activated by a user (e.g., is the character code of the user-activated key 34). The other character codes in the packet may or may not be associated with the particular key 34 activated by a user and are generated (e.g., at random) by the secure mode logic 32 of the keyboard 30. Only the application 18, not the operating system 16 can determine which of the character codes in the packet to extract/use as the character code associated with the keyboard key 34 pressed by the user (referred to herein as the "correct" character code). This technique of "key flooding" thus involves transmitting the correct character code (the one associated with the key pressed by the user) amid one or more other, possibly randomly generated, character codes (or codes chosen to resist entropy analysis) in a serial sequence of character codes. Unless the logic receiving the packet of character codes knows which element of the sequence contains the correct character code, the receiving logic will not be able to accurately interpret the data provided by the keyboard 30.

Referring to the illustrative example of FIG. 3, the first packet of character codes generated by the keyboard 30 is associated with an index value of 2, a length value of 3 and a delay value indicative of a delay from 1 to 20 milliseconds (ms). This means that the second character code in the packet is the correct character code, that the length of the packet is 3 character codes, and that a time delay between each of the three characters generated is from 1 to 20 milliseconds. The other two character codes can be any character codes, but are not both the same as the correct code in various embodiments.

The next time a user presses a keyboard key 34 the keyboard 30 generates another packet of character codes in accordance with an index value of 3, a length value of 20 and a delay value indicative of a delay from 3 to 14 ms. This means that the third character code in this packet is the correct character code, that the length of the packet is 20 character codes, and that the time delay between each the 20 generated characters is a random, or otherwise, value between 3 and 14 ms. A third and fourth packet are generated in the same fashion.

Once the fourth packet corresponding to the fourth set of index, length and delay values (2, 30 character codes, and 1-21 ms) is generated, the data structure 40 may be used again for subsequent activation of keyboard keys 34. That is, the data structure 40 may be repeatedly used to generate packets. In other embodiments, once a data structure 40 is exhausted (i.e., each of its index, length, and delay values are used to generate character code packets), the shared secret logic 20 generates a new shared secret which is then used to overwrite and re-populate the data structures 40 of the keyboard 30 and application 18. As such, the shared secret is used as a form of a "one time pad" (OTP).

Each packet of character codes is received by the application 18. The application has an identical copy of the data structure 40 that was used by the keyboard's secure mode logic 32 to generate the packet. The data structure 40 in storage 14 used by the application was populated in the same way using the same shared secret. The application 18 uses its copy of the data structure to extract the correct character code. The index values point to the character code in each packet that is the correct code (i.e., the code associated with the key pressed by the user'. The length value is used by the application to determine the end of each packet (e.g., the length value minus the index value represents the number of character codes remaining in the packet following the correct character code). The time delay (or range of time delay values) exists to resist timing attacks by a key logger.

Figure 4:
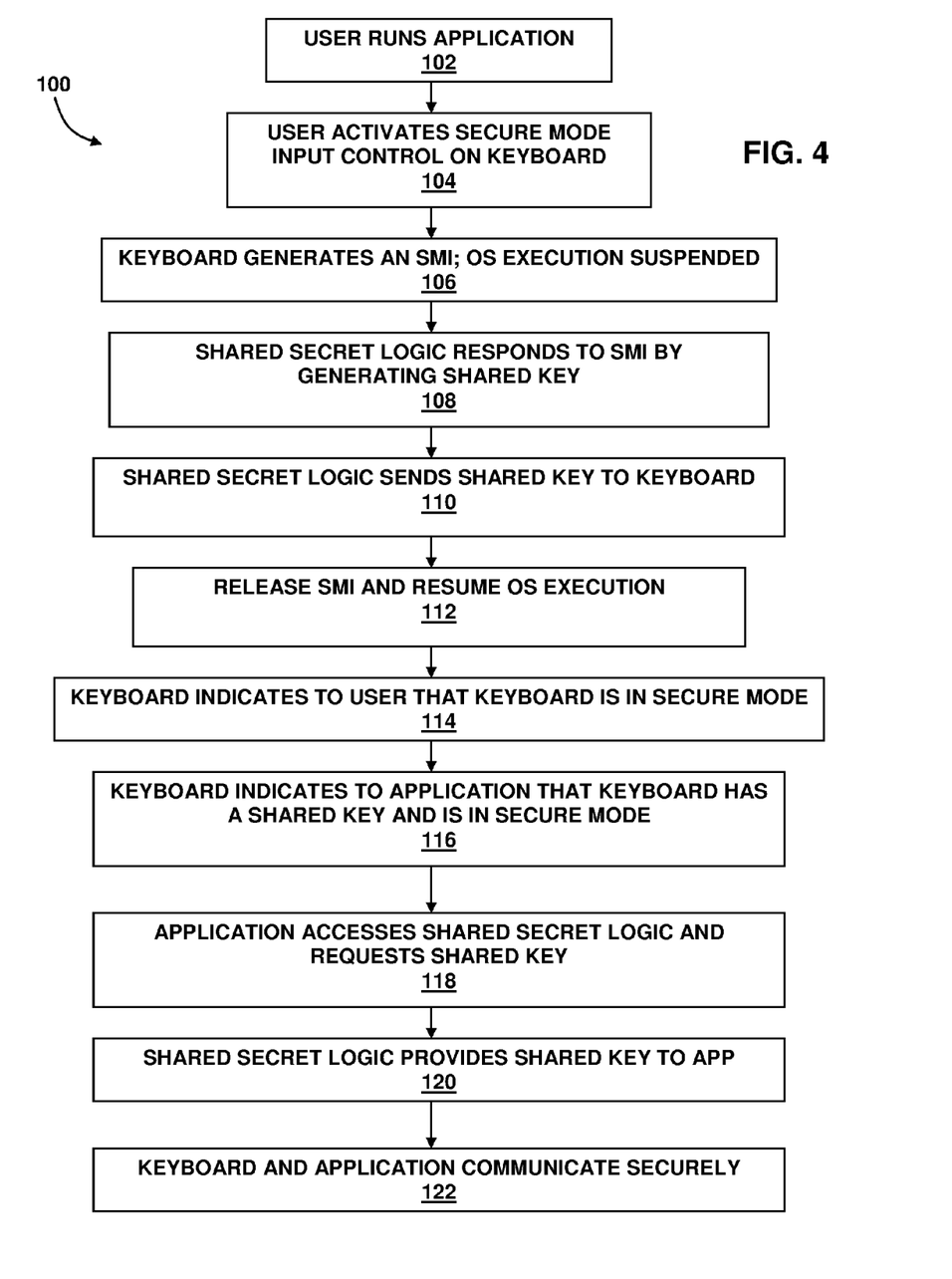
FIG. 4 shows a method for generating the shared secret in accordance with various embodiments.

FIG. 4 illustrates a method 100 for generating the shared secret in accordance with various embodiments. The actions shown can be performed in the order shown or in a different order. Further, some of the actions can be performed concurrently (e.g., in parallel).

As shown, method 100 comprises a user running an application (102). As noted above, the application may be any application such as an Internet browser, word processing program, etc. Running the application comprises, for example, "double clicking" an icon representative of the application on the display 15. At 104, the user activates the secure mode input control 36 on the keyboard 30 to implement a secure keyboard input channel from the keyboard 30 to the application 18. alternatively, the application 18 may initiate the secure keyboard input channel. The keyboard's secure mode logic 32 generates a system management interrupt (SMI) at 106 to cause the shared secret logic 20 to generate a shared secret. A characteristic of SMI handler code is that such code executes outside the control and involvement of the operating system 16. During execution of the SMI, execution of the operating system 16 is suspended. In this way, the shared secret logic 20 can generate a shared secret without the operating system 16 having possession of, or access to, the shared secret.

At 108, the shared secret logic 20 responds to the SMI by generating a shared secret. In some embodiments, the shared secret logic 20 comprises a trusted platform module (TPM), a secure digital (SD) card or other mechanism for generating a shared secret provided only to the secure mode logic 32 of the keyboard 30 and application 18. At 110, the shared secret logic 20 sends the shared secret to the keyboard 30. At 112, the SMI is released and the operating system 16 resumes execution.

At 114, the keyboard 30 provides an indication to the user that the keyboard 30 is now in a secure mode of operation with regard to the application 18 that is in focus. The indication comprises visual feedback via the indicator 38 (e.g., an LED). The keyboard provides an indication (e.g., sends a signal) to the application 18 that the keyboard 30 has a shared secret and is in its secure mode (116). Upon determining that the keyboard 30 is in a secure mode, the application 18 requests at 118 the shared secret from the shared secret logic 20. At 120, the shared secret logic 20 provides the shared secret to the application possibly, for example, a secure transport session between the application and a trusted platform module (TPM) through the use of a TCG Software Stack (TSS). In such embodiments, the TSS is loaded as an in-process server residing in the address space of the application. The TSS provides mechanisms for creating a secure transport session between an application and a TPM. Other techniques can be used to further obfuscate the shared secret in the address space of the application. Once both the keyboard 30 and application 18 are provided the shared secret, the keyboard (i.e., the secure mode logic 32) and application 18 use the shared secret to provide keyboard data from the keyboard 30 to the application (122) in a secure communication channel.

In some embodiments, rather than embedding the character code associated with the keyboard key activated by the user among one or more additional character codes, the character code associated with the user-activated keyboard key is modified. In accordance with some such embodiments, the modification comprises altering the character code in accordance the shared secret. For example, the character code is exclusive-OR'd (i.e., the logical exclusive-OR operation) with all or a portion of the shared secret. The resulting modified character code can be converted back to its unaltered form by the application 18 exclusive OR'ing the modified character code received from the keyboard 30 with the same shared secret or sub-portion thereof that was used by the keyboard 30 to modify the character code in the first place.

Figure 5:
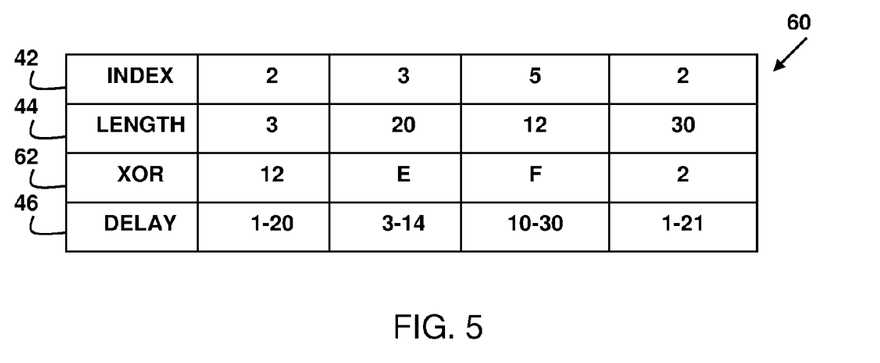
FIG. 5 shows another embodiment of a data structure that is populated by a shared secret.

FIG. 5 illustrates an embodiment of a data structure 60 that is similar to the data structure 40 of FIGS. 2 and 3. The data structure 60 includes an extra row of data 62. This data, which is populated in the data structure from the shared secret comprises values that are used in the exclusive-OR operation as described above. That is, the keyboard 30 generates a first packet in which the correct character code is the second code in the packet having three character codes. The time delay between the generated key codes is in the range of 1 to 20 ms. The correct code is exclusive-OR'd with the value "12" and the resulting character code so modified is placed in the packet as the second of three elements in the packet. Upon receiving this packet, the application 18 extracts the second element and computes the exclusive-OR operation of the extracted element with the same value ("12") to recover the correct character code.

In some embodiments, the character codes transmitted from the keyboard 30 to the application 18 are encrypted using all or some of the shared secret as an encryption/decryption key. The operating system and other applications running under the operating system will not have access to the shared secret and thus will not be able to correctly decrypt the encrypted character codes. The encrypted character codes may be transmitted without being embedded in a packet with other character codes, or may be embedded in such packets as desired.

In some embodiments, each packet generated by the keyboard 30 is of the same length. The position (index) of the character code in each packet may vary from packet to packet. That is, all of the packets may have a length of, for example, 10. The length may be provided in the data structure 40, 60 or may be pre-programmed and implicitly understood by the keyboard's secure mode logic 32 and application 18. In one packet, the correct character code may be the second element, while in another packet, the correct character code may be the sixth element.

In various embodiments, the specified position in the packet for the correct character code may be fixed, but the length of each packet may vary. For example, the correct character code may be placed in the third position in each of multiple packets whose length varies from 3 to a number greater than 3. In such embodiments, the index value (3 in this example) may be provided in the data structures 40, 60 or may be implicitly understood (e.g., a configuration policy) by the keyboard 30 and application 18.

As such, the packets have at least two characteristics that can individually be programmed by way of the shared secrets and data structures 40, 60 that help to implement the secure communication channel between the keyboard 30 and application 18. One characteristic is the position within a packet (index) at which the correct code is located and the other characteristic is the length of each packet. Either or both characteristics can be specified on a per-packet basis by the shared secret.

As described herein, the user activates the secure mode activation control 36 to establish a secure communication channel between the keyboard 30 and application 18. The user can selectively establish a secure communication channel between the keyboard and each of multiple applications 18. Each such secure communication channel uses a different shared secret in various embodiments. With regard to some applications 18, a secure communication channel is established, while for other applications, a secure communication channel is not established. Each time a user causes an application 18 to be "in focus" (e.g., by clicking on that application using pointing device 31), the shared secret, if there is one associated with that application, is used as the user operates the keyboard 30 to interact with the application.

Figure 6:
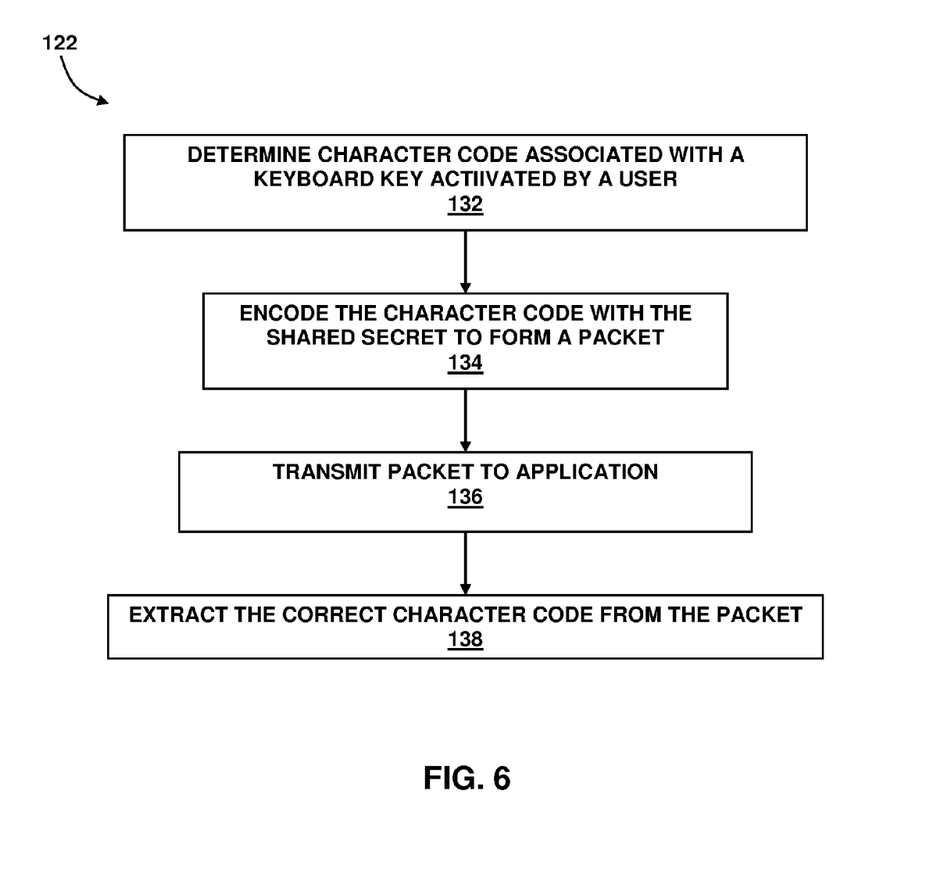
FIG. 6 shows a method of using the shared secret to conduct a secure communication flow from a keyboard to an application in accordance with various embodiments.

FIG. 6 illustrates an embodiment of action 122 for conducting a secure communication channel from the keyboard 30 to the application 18. At 132, method 122 comprises determining a character code associated with a keyboard key activated by a user. At 134, the method comprises encoding the character code with the shared secret to form a packet. Encoding the character code comprises any of the techniques described herein. The packet is then transmitted to the application 18 with which the user is currently interacting (136). At 138, the application extracts the correct character code from the packet.

The use of the shared secret, known to the keyboard and application, but not the operating system or other applications running under the operating system, helps to defeat key logging software. Such key logging software will not have access to the shared secret necessary to correctly decode the keyboard packets and thus will not be able to determine which keys the user has pressed on the keyboard.

In some embodiments the beginning of each packet of character codes can be identified by a pre-designated sequence of bits (a "marker"). The marker may be specified by a value in the shared secret.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor which executes an operating system and an application; and
a keyboard coupled to said processor;
wherein said keyboard and said application share a shared secret, said shared secret not being known or accessible to said operating system; and
wherein said shared secret is used to produce a sequence of keyboard character codes each time a key on the keyboard is pressed; and
wherein each sequence is variable in at least one of the number of keyboard character codes included in the sequence and a location in the sequence at which the character code corresponding to the key pressed is located.

2. The system of claim 1 further comprising logic coupled to said processor that generates said shared secret.

3. The system of claim 1 wherein said logic comprises logic selected from a group consisting of a TPM and an SD card.

4. The system of claim 1 wherein said shared secret comprises an index value that indicates which of the plurality of character codes corresponds to the keyboard key activated by the user.

5. The system of claim 1 wherein that the number of keyboard character codes in each sequence is determined by said shared secret.

6. The system of claim 5 wherein said shared secret comprises a separate index value for each packet, at least two of the index values being different from each other.

7. The system of claim 5 wherein said shared secret comprises a value indicative of a time delay between said packets.

8. The system of claim 1 wherein said shared secret comprise a value that is exclusive OR'd with a character code associated with a keyboard key activated by a user.

9. The system of claim 1 wherein the keyboard stores a data structure that includes a plurality of index values, and for each index value the data structure includes a corresponding length value, said length value specifying the number of keyboard character codes in a sequence, and each index and length value is populated with a portion of the shared secret.

10. The system of claim 9 wherein, based on pressing a key on the keyboard, the keyboard generates a sequence to have a length of one of the length values in the data structure and the keyboard character code of the pressed key is included in the sequence based on the index value corresponding to said length value.

11. The system of claim 9 wherein the data structure includes delay values, a delay value corresponding to an index value and a length value, each such delay value indicating a time delay between each keyboard character code in a given sequence, and wherein each delay value in the data structure is populated with a portion of the shared secret.

12. A system, comprising: host logic; and
a keyboard coupled to said host logic;
wherein said keyboard and said host logic share a shared secret, and, for each key pressed on the keyboard, said keyboard generates a sequence containing multiple keyboard character codes, including a keyboard character code of the key pressed, and transmits the sequence to said host logic;
wherein, based on the shared secret, the keyboard varies both a length of each sequence and a location of the keyboard character code of the pressed key within each sequence of keyboard character codes.

13. The system of claim 12 further comprising an application and an operating system, wherein said shared secret is provided to the keyboard and application, but not the operating system.

14. The system of claim 12 wherein said shared secret comprises an index value that indicates which of said multiple keyboard character codes transmitted to said host logic is associated with the key pressed.

15. The system of claim 12 wherein said shared secret comprises a value that is exclusive OR'd with the keyboard character code associated with the key pressed.

16. The system of claim 12 wherein said keyboard populates a table using said shared secret, said table comprising entries for at least one of an index value, a length value, and a time delay value.

17. A method, comprising:
determining a character code associated with a keyboard key activated by a user;
based on the keyboard key being activated, selecting a length value and an index value from a data structure in the keyboard, said data structure populated using a shared secret and containing a plurality of index values and corresponding length values;
based on the keyboard key being activated, generating a sequence of keyboard character codes including said determined character code, said sequence having a length equal to the selected length value and the determined character code positioned at a specific location in the sequence based on the selected index value; and
transmitting said sequence to an application.

18. The method of claim 17 further comprising generating the shared secret, said shared secret comprising at least one of a character code index value, a packet length value, a time delay value, and a value to be used in a logical operation with said determined character code.

19. The method of claim 17 further comprising selectively establishing communication flows between said keyboard and each of a plurality of applications, each communication flow using a different shared secret.

* * * * *

UNITED STATES PATENT AND TRADEMARK OFFICE
CERTIFICATE OF CORRECTION

| | | |
|---|---|---|
| PATENT NO. | : 9,292,715 B2 | Page 1 of 1 |
| APPLICATION NO. | : 12/812497 | |
| DATED | : March 22, 2016 | |
| INVENTOR(S) | : Wael M. Ibrahim et al. | |

It is certified that error appears in the above-identified patent and that said Letters Patent is hereby corrected as shown below:

In the Drawings:

In sheet 4 of 4, reference numeral 132, line 2, delete "ACTIIVATED" and insert -- ACTIVATED --, therefor.

Signed and Sealed this
Fifth Day of July, 2016

Michelle K. Lee
*Director of the United States Patent and Trademark Office*